United States Patent [19]

Hudson

[11] 4,181,559

[45] Jan. 1, 1980

[54] PRESSURE SENSITIVE TAPE APPLICATOR APPARATUS

[76] Inventor: William S. Hudson, 2640 Reed St., N.E., Washington, D.C. 20018

[21] Appl. No.: 878,439

[22] Filed: Feb. 16, 1978

[51] Int. Cl.² .................. B32B 35/00; B32B 31/00
[52] U.S. Cl. ................................. 156/389; 156/519
[58] Field of Search ............ 156/264, 265, 519, 521, 156/517, 389

[56] References Cited

U.S. PATENT DOCUMENTS

| | | | |
|---|---|---|---|
| 2,209,765 | 7/1940 | Cormack | 156/521 |
| 3,879,246 | 4/1975 | Walker | 156/519 |
| 3,955,481 | 5/1976 | Heitmann | 156/521 |

Primary Examiner—Douglas J. Drummond
Attorney, Agent, or Firm—Roylance, Abrams, Berdo & Farley

[57] ABSTRACT

Apparatus and method for sequentially applying predetermined lengths of pressure sensitive tape having an exposed tacky side onto a continuous web of flexible material in spaced relationship. Means are provided for continuously moving the web past a predetermined tape applying position, for conveying a continuous strip of tape from a source through a rotary cutting assembly, and for conveying the cut strips of tape sequentially to the tape applying position into contact with the web wherein during conveyance of the tape areas devoid of adhesive are engaged.

11 Claims, 6 Drawing Figures

PRESSURE SENSITIVE TAPE APPLICATOR APPARATUS

BACKGROUND OF THE INVENTION

The present invention relates to an apparatus and method for sequentially applying predetermined lengths of pressure sensitive tape onto a continuous web of flexible material, such predetermined lengths being in a spaced relationship along the continuous web. More particularly, the present invention relates to an apparatus and method for rapidly cutting and applying strips of pressure sensitive tape to a continuously moving web of wrapping paper, wherein the tape comprises double-sided adhesive tape with a removable backing member so that, after removal of the backing member, the tape can be used to fasten the ends of the wrapping paper.

As used herein the phrase "pressure sensitive tape" comprises double-sided, pressure sensitive adhesive tape with a lift-off backing member contacting one of the sides and having a width slightly greater than the width of the double-sided adhesive tape so as to leave on opposed edges of the backing member areas devoid of the adhesive. An example of such pressure sensitive tape is the product called SUPER-STIK, which is a double-sided transfer tape and which is manufactured by the Universal Tape Company, Ocean City, New Jersey.

As disclosed in U.S. Pat. No. 3,677,144, issued on July 18, 1972 to Earl A. Hudson, a continuous web of wrapping paper is moved through and manipulated by an apparatus to form the wrapping paper into discrete tubular wrappers for boxes. In effect, the apparatus of that patent forms discrete sleeves into which the boxes are placed, with the ends of the sleeves extending past the box received in each sleeve and with these ends then being folded and secured by suitable means such as adhesive tape. Alternatively, double-sided transfer tape with a backing member could be placed on the sleeve before the box is inserted. As disclosed in that patent, in all events this tape would have to be placed over the sleeve ends after the sleeves are formed.

Unfortunately, applying this tape is extremely time consuming and necessitates large amounts of manual labor. Moreover, it includes an extra step requiring transport and manipulation of the sleeve.

In addition to such manual placement of tape on the ends of the sleeves, the prior art discloses various semi-automatic devices which utilize a reciprocating mechanism for applying cut lengths of pressure sensitive tape to discrete lengths of wrapping paper; however, these are also extremely slow because the reciprocating nature of the device consumes significant nonproductive time. Moreover, while various conveying mechanisms can be utilized in conjunction with the reciprocating applicator, such conveying mechanisms must be intermittent, so that further significant nonproductive time is present in such a combination.

One solution to this problem of applying adhesive tape to the ends of these sleeves is to utilize double-sided adhesive tape with a backing member and applying such in predetermined lengths to the continuous web disclosed in U.S. Pat. No. 3,677,144 before the web is cut into discrete sections. Of course, utilizing the reciprocating applicators of the prior art still does not completely solve the problem since the intermittent reciprocation of the device is time consuming and wasteful.

Another prior art device, used in the construction of vacuum cleaner bags, is known which cuts predetermined lengths of heavy brown kraft paper and sequentially conveys these cut lengths to a continuous web of porous vacuum bag paper which has periodically applied thereto adhesive to adhere the cut lengths to the web in spaced relationship. The cut lengths are used to reinforce the vacuum bag once the web is formed into separate bags. However, this device is not at all suitable for applying to a web pressure sensitive tape which has an exposed tacky side since the tacky side is so sticky that it immediately sticks to any dry surface with which it comes in contact, including such modern plastics as poyethylene, nylon and TEFLON. Thus, this prior device utilized flat draw rollers to pull the kraft paper from its roll which, if one side were tacky, would fail to successfully feed due to adherence of the tacky side to the rolls. In addition, the prior device utilized two opposed belt conveyors straddling the entire width of the kraft paper to convey the paper from a cutter to the web which would not be suitable for the tacky pressure sensitive tape since the tacky side would adhere to one of the flat belt conveyors.

SUMMARY OF THE INVENTION

Accordingly, it is an object of the present invention to provide an apparatus and method for sequentially applying pre-determined lengths of pressure sensitive tape having an exposed tacky side onto a continuous web of flexible material which does not utilize a reciprocating applicator and does not utilize an intermittent conveying of the continuous web, but utilizes a sequential applicator of the cut lengths of pressure sensitive tape and continuously conveys the web of flexible material as the application of the tape proceeds, wherein only areas devoid of adhesive are engaged during conveyance.

Another object of the present invention is to provide an apparatus and method for cutting, conveying and applying pressure sensitive tape which engages the tape in areas devoid of adhesive so as to provide the required operation quickly, reliably and smoothly with little chance of the tape adhering to the apparatus.

Another object of the present invention is to provide an apparatus and method which can quickly and in one smooth flowing operation sequentially apply predetermined lengths of pressure sensitive tape onto a continuously moving web of flexible material.

The foregoing objects are attained by providing an apparatus for sequentially applying predetermined lengths of pressure sensitive tape onto a continuous web of flexible material in spaced relationship comprising a first means for supporting a continuous web of flexible material; a second means, engaging the continuous web, for feeding the continuous web of flexible material past a predetermined tape applying position; a third means for supporting a continuous strip of pressure sensitive tape; a fourth means, located downstream of the third means, for sequentially cutting the continuous strip of pressure sensitive tape into predetermined lengths; a fifth means, located downstream of the third means, for feeding the continuous strip to the fourth means for cutting; and a sixth means for sequentially conveying the cut predetermined lengths in spaced relationship from the fourth mean for cutting into adhering contact with the continuous web of flexible material at the predetermined position, said sixth means including means for engaging the pressure sensitive tape in at least one area devoid of adhesive.

The fifth means comprises a pair of opposed draw rolls, one roll having flanges at both ends which are knurled and which engage the tape in areas devoid of adhesive.

The sixth means for sequentially conveying includes three belt conveyors, two spaced belts mounted above the path of the tape and a second mounted below the path of the tape with the upper two engaging the tape in the areas devoid of adhesive.

The method for sequentially applying the predetermined lengths of pressure sensitive tape onto a continuous web of flexible material includes the steps of continuously feeding a continuous web of flexible material past a predetermined applying position, simultaneously, continuously feeding a continuous strip of pressure sensitive tape in a predetermined direction, sequentially cutting the strip of pressure sensitive tape into predetermined lengths, and sequentially conveying the cut predetermined lengths in spaced relationship into adhering contact with the continuous web of flexible material at the predetermined applying position, this last step including engaging the tape in areas devoid of adhesive.

As used here, the phrase "continuous web of flexible material" includes a continuous expanse of thin, foldable and bendable material such as wrapping paper.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

DETAILED DESCRIPTION OF THE INVENTION

Figure 1:
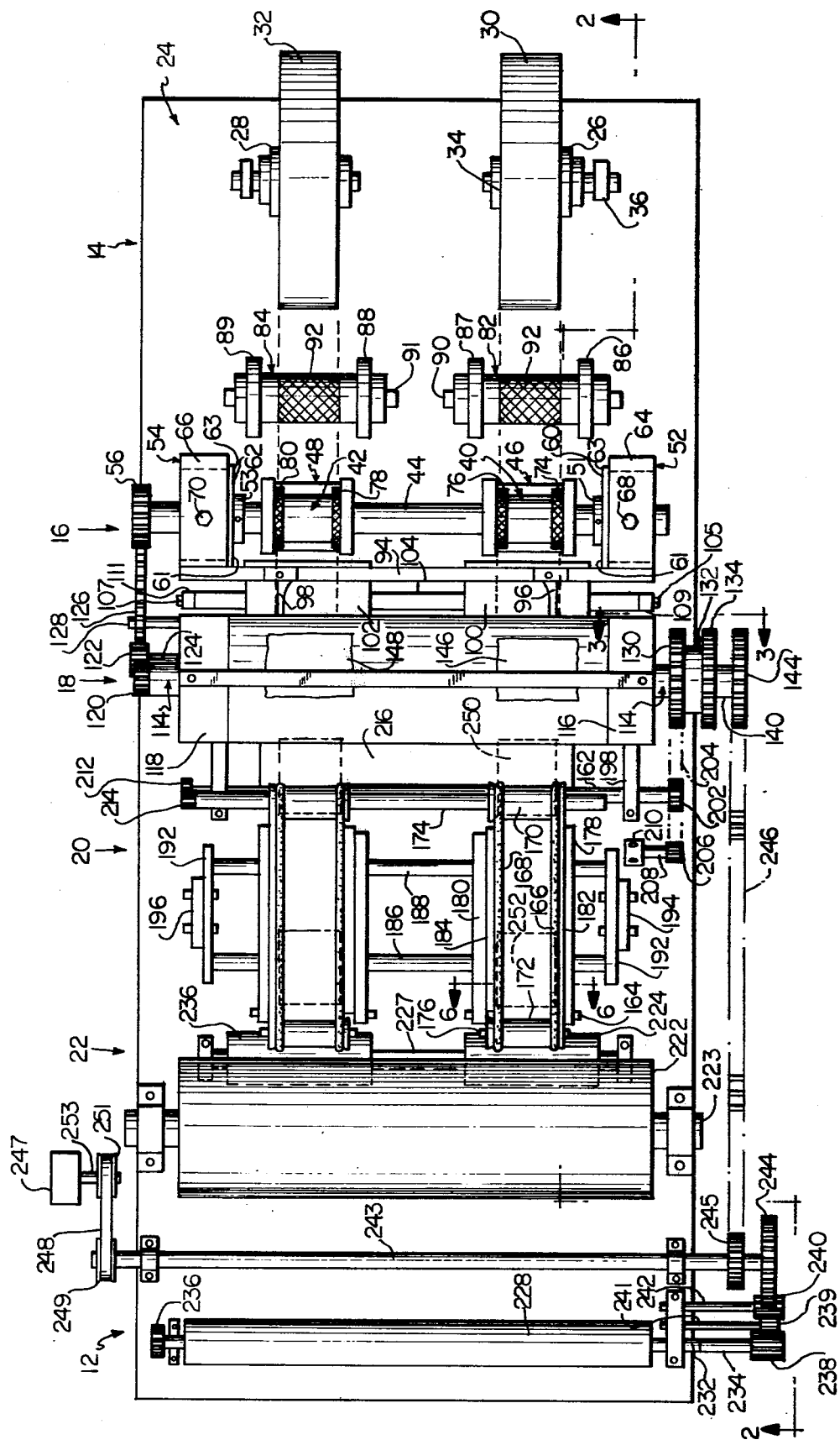
FIG. 1 is a top plan view of the apparatus in accordance with the present invention which has the source of the continuous web of flexible material excluded therefrom for clarity.
Figure 2:
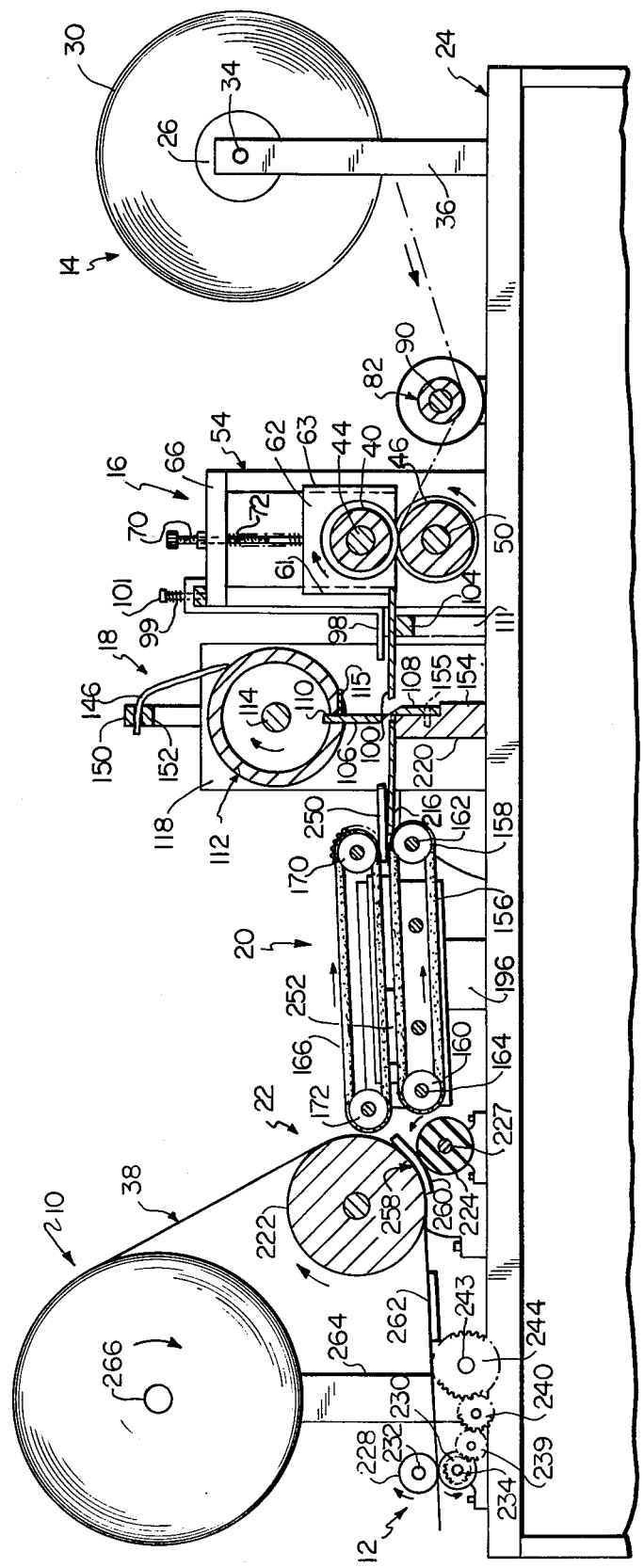
FIG. 2 is a vertical sectional view in elevation taken along lines 2—2 in FIG. 1.

Referring now to FIGS. 1 and 2, the overall apparatus of the present invention includes a continuous web support assembly 10, a web feeding assembly 12, a pressure sensitive tape support assembly 14, a tape feeding assembly 16, a tape cutting assembly 18, a cut tape conveying assembly 20 and a tape applying assembly 22. Preferably, all of these various assemblies are supported on a table or base 24.

As seen in FIGS. 1 and 2, the tape support assembly 14 comprises two reels 26 and 28, each containing a source of rolled pressure sensitive tape 30 and 32, respectively. Reel 26 has horizontally oriented shaft 34 received therein, which shaft is rigidly supported by a vertically oriented support bar 36 fixedly supported on the top of base 24. Reel 28 is similarly supported, so its support will not be discussed in detail. As seen in FIG. 1, reels 26 and 28 are horizontally spaced across the transverse width of base 24 so as to ultimately feed two rows of pressure sensitive tape in predetermined lengths onto the continuous web 38 shown in FIG. 2. As will be described in further detail below, additional reels of tape can be provided with an increase in the number of manipulating assemblies so that more than two rows of tape in cut predetermined lengths can be applied to the continuous web 38. Moreover, if only one row is required, then only one reel of tape is utilized. Moreover, the transverse location of the various assemblies to be described in more detail hereinafter can be varied so that the precise transverse location of the predetermined lengths of tape can be varied along the width of the continuous web 38.

Downstream of the reels of tape is the tape feeding assembly 16 which includes a pair of upper draw rolls 40 and 42 fixedly mounted on transverse shaft 44 and a pair of lower draw rolls 46 and 48 fixedly mounted on transverse shaft 50.

Figure 5:
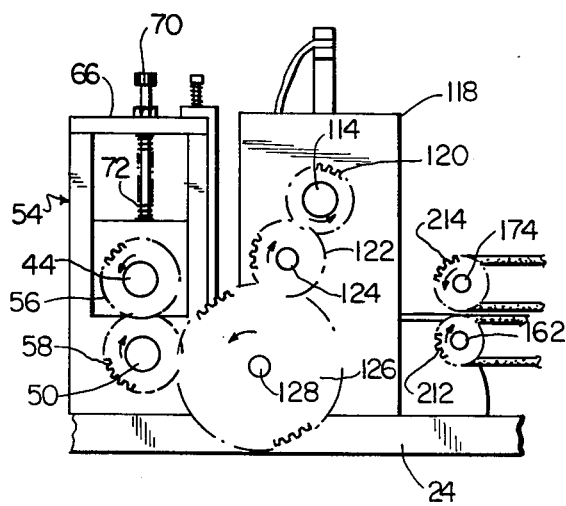
FIG. 5 is a fragmentary rear elevational view of the sprocket wheel assembly for a portion of the present invention.

As seen in FIGS. 1, 2 and 5, these shafts 44 and 50 are parallel and vertically spaced, with shaft 50 being rotatably mounted at its opposite ends in upright supports 52 and 54 which are rigidly secured to the top of base 24. Two set collars (not shown) on opposite ends of shaft 50 adjacent supports 52 and 54 hold shaft 50 in place. As best seen in FIG. 5, upper shaft 44 has gear 56 rigidly supported at the end thereof and lower shaft 50 has gear 58 fixedly attached at the end thereof, these two gears being engagement.

Both of the upright supports 52 and 54 have U-shaped cut outs receiving therein rectangular shaped support blocks 60 and 62, respectively, each of these support blocks rotatably receiving an opposite end of transverse upper shaft 44. Two set collars 51 and 53, seen in FIG. 1, hold shaft 44 in place and maintain blocks 60 and 62 in the cut outs with ears 61 and 63 on each block contacting each upright support. As seen in FIGS. 1, 2 and 5, cross bars 64 and 66 close the U-shaped cut outs on the top of each upright support 52 and 54 and receive therein threaded rods 68 and 70, respectively, which extend downwardly toward the support block 60 and 62 and have springs 72 thereon to spring bias each support block and its supported upper draw roll 40 and 42 downwardly into contacting engagement with the respective lower draw rolls 46 and 48.

As best seen in FIGS. 1 and 2, each of the four draw rolls 40, 42, 46 and 48 are comprised of a cylindrical portion with enlarged flanges at opposite ends thereof. The diameter of the cylindrical portion and the flange portions of the upper draw rolls are smaller than similar diameters on the lower draw rolls. As best seen in FIG. 1, flanges 74 and 76 on upper draw roll 40 and flanges 78 and 80 on upper draw roll 42 are knurled so they can frictionally engage the edges of the pressure sensitive tape which is devoid of the double-sided adhesive tape located in the middle of the backing member. As best seen in FIG. 2, the flanges of the upper rolls are biased into intimate contact with the central cylindrical portion of the lower draw rolls so as to firmly grip the pressure sensitive tape once it is maneuvered between the opposed upper and lower draw rolls, at which time these draw rolls are slightly spaced by the thickness of the pressure sensitive tape in those areas devoid of adhesive.

Although only two sets of upper and lower draw rolls are shown, additional sets may be utilized and supported on the transverse shafts, with an increase in the number of remaining assemblies, in order to provide additional rows on the continuous web 38 of predetermined lengths of cut pressure sensitive tape. In addition, while two sets are shown, only one may be utilized if only one row is required on the continuous web 38. Moreover, the location of the sets of draw rolls can be varied transversely so that the spacing of the rows of predetermined lengths of pressure sensitive tape on the continuous web 38 can also be varied.

The tape feeding assembly 16 also includes a guide assembly including two guide rolls 82 and 84 interposed between the reels of tape 30 and 32 and the two sets of draw rolls 40, 42, 46 and 48. These guide rolls 82 and 84 are rotatably supported in vertical support bars 86, 87, 88 and 89 via shafts 90 and 91, respectively. Each roll has a cylindrical main portion and opposed flanges, each having a central knurled portion 92 having a width equal to the width of the tape so as to increase the friction between the tape and the guide roll. If additional reels of tape are utilized on the apparatus, additional guide rolls may be added. Additionally, although not shown, the guide rolls 82 and 84 can be on a common shaft so that their position transverse of the base 24 can be varied to vary the transverse location of the predetermined lengths of cut pressure sensitive tape on the continuous web 38.

As seen in FIG. 2, the shaft 90 of guide roll 82 is located parallel to shaft 50 in the tape feeding assembly and is spaced above the top of base 24 approximately the same distance as shaft 50. Moreover, it is noted that the tape 30 leaves the reel 26, passes under guide roll 82 and then upwardly into the nip formed between the opposed upper and lower draw rolls 40 and 46.

Extending downwardly from a transverse bar 94 coupled at both ends to cross bars 64 and 66 are two L-shaped flexible guide bars 96 and 98. The bottom of these guide bars hold down the top of the tape as it exits from the draw rolls and is therefore located just above the path of the tape. THe guide bars are biased downwards via springs 99 on bolts 101.

Located just below the guide bars are two flexible plates 100 and 102, which are rigidly supported, as by riveting, in transverse spaced relation to the top of a transverse square bar 104 which is trapped at the ends and receives threaded bolts 105 and 107 therein. These bolts are each supported in threaded bores at the top of upright supports 109 and 111 so that the angle of plates 100 and 102 can be varied. Each of these plates 100 and 102 extends transversely past respective ones of the two sets of draw rolls.

Located downstream from the tape feeding assembly 16 is the tape cutting assembly 18 which comprises two sets of rotary shear knives or blades 106 and two sets of fixed shear knives 108, one set of which is shown in FIG. 2. The two rotary shear knives 106 are received in a slot 110 in cylinder or housing 112 which is fixedly supported on transverse shaft 114 which is in turn rotatably supported at its ends in suitable bores in upright supports 116 and 118 located on opposite sides of base 24. Gear 120, as seen in FIGS. 1 and 5, is rigidly supported at an end of shaft 114 exterior to support 118 which in turn engages gear 122 which is rotatably mounted to stub shaft 124 rigidly coupled to the exterior surface of support 118. The rotary shear knives 106 are maintained in place by set screws, one of which is shown in FIG. 2 and designated 115. Although, as shown in FIG. 2 the knives 106 and 108 have their longer straight edges facing the right and the left, respectively, this can be reversed.

As also seen in FIG. 5, a large gear 126 is rotatably mounted on stub shaft 128 which extends from upright support 118, this gear 126 being in engagement with gear 122 and also gear 58 which is rigidly coupled to shaft 50 having the lower draw rolls 46 and 48 thereon. Accordingly, rotation, as seen in FIG. 5, in the counterclockwise direction of gear 120, which is coupled to the rotary shear knives 106, results in a clockwise rotation of gear 122, a counterclockwise rotation of sprocket wheel 126, a clockwise rotation of gear 58 and a counterclockwise rotation of gear 56. Thus, the upper draw rolls 40 and 42 rotate counterclockwise as seen in FIG. 5 and the lower draw rolls 46 and 48 rotate clockwise as seen in FIG. 5.

Figure 3:
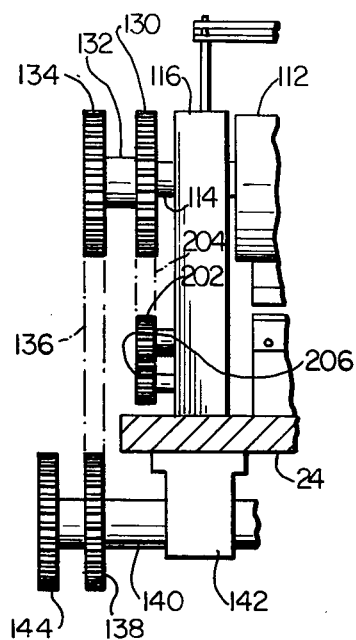
FIG. 3 is a fragmentary sectional view in elevation taken along lines 3—3 in FIG. 2.
Figure 4:
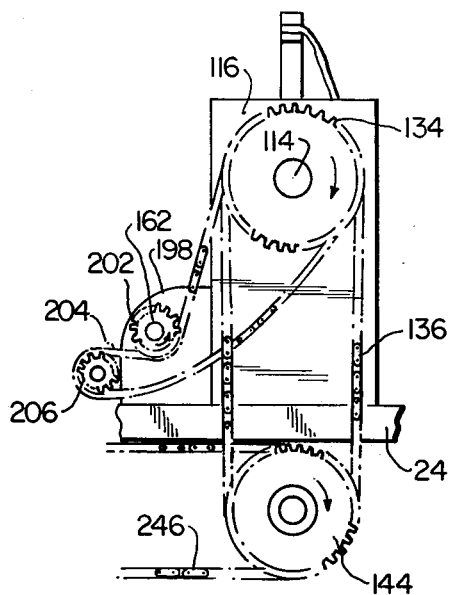
FIG. 4 is a fragmentary front elevational view of the apparatus shown in FIG. 3.

Referring now to FIGS. 1, 3 and 4, shaft 114 carrying cylinder 112 in the tape cutting assembly 18 extends outwardly from upright support 116 into fixed engagement with sprocket wheel 130 which in turn along rode 132 is fixedly engaged with sprocket wheel 134. This sprocket wheel 134 is connected via chain 136 to sprocket wheel 138 located below sprocket wheel 134 and rigidly attached to shaft 140 which is journaled in support 142 which is connected to the bottom of base 24. Shaft 140 extends outwardly and is rigidly connected at its end to sprocket wheel 144 adjacent but spaced from sprocket wheel 138. Thus, rotation of sprocket wheel 144 in the clockwise direction as shown in FIG. 4 results in a similar rotation of sprocket wheel 138 as well as sprocket wheels 134 and 130 so that shaft 114 is similarly rotated in a clockwise rotation providing the counterclockwise rotation of shaft 114 as seen in FIG. 5, which is the opposite side of the apparatus from FIGS. 4 and 3.

Referring specifically to FIGS. 1 and 2, supported on upright supports 116 and 118 is an oil dispensing mechanism comprising two pieces of cloth 146 and 148 which are supported by transverse bars 150 and 152 as seen in FIG. 2 so that they contact the outer surface of cylinder 112. These two pieces of cloth are transversely spaced so that rotary shear knives 106 contact the pieces of cloth on each rotation and, these pieces of cloth having been soaked in oil such as "3&1 Oil", dispenses oil to these shear knives. This reduces the tendency of the shear knives 106 from sticking to the adhesive on the top of the pressure sensitive adhesive which they are cutting.

Referring specifically to FIG. 2, the fixed bottom shear knife 108 is shown rigidly secured by bolts 155 in a slot on block 154, which extends transversely on base 24, and has its shearing edge pointed upwardly. A second fixed shear knife 108, not shown, is located behind the one shown in FIG. 2 along the path of tape 32 as it moves from the right to the left in FIG. 1.

Referring now to FIGS. 1 and 2, the conveying assembly 20 for the cut lengths of tape comprises two similar, mirror-image sets of upper and lower conveyors, so only one will be described for brevity.

As seen in FIG. 2, a lower endless belt conveyor 156 is supported at opposite ends by rollers 158 and 160, roller 158 being rigidly supported on shaft 162 and roller 160 being rigidly supported on shaft 164.

Figure 6:
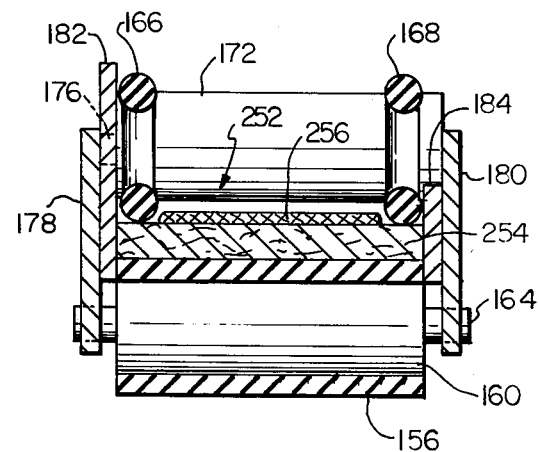
FIG. 6 is an enlarged sectional view in elevation taken along lines 6—6 in FIG. 1.

As seen in FIGS. 1, 2 and 6, the upper conveyor is formed by two thin endless strips or belts 166 and 168 which are journaled at respective ends in slotted rolls 170 and 172. Roll 170 is rigidly secured to transverse shaft 174 and roll 172 is rigidly supported on stub shaft 176. As seen in FIGS. 1 and 6, support bars 178 and 180 are on opposite sides of the belts 156, 166 and 168 with support bar 178 having channel bar 182 rigidly secured thereto and immediately adjacent belt 166 with support bar 180 having rigidly secured thereto channel bar 184 which is adjacent endless belt 168.

As seen in FIG. 6, these two channel bars 182 and 184 contact the lower run of the endless belt 166 and 168 and the upper run of belt 156 on their exteriors and thereby form a channel through which these endless belts run.

As best seen in FIG. 1, support bar 180 supports shaft 164 for roller 160 and channel bar 182 supports stub shaft 176 carrying roll 172.

The two sets of upper and lower belt conveyors are supported on transverse rods 186 and 188 which extend therethrough and are in turn rigidly supported on base 24 via transverse bars 190 and 192 which are rigidly coupled respectively to supports 194 and 196 extending upwardly from the top of base 24.

As best seen in FIG. 1, transverse shaft 162 is supported for rotation on supports 198 and 200 located respectively adjacent upright supports 116 and 118.

As best seen in FIGS. 1, 3 and 4, the end of shaft 162 adjacent support 116 has sprocket wheel 202 rigidly attached thereto which is engaged by chain 204 which is received on sprocket wheel 130 coupled to shaft 114 and to idler sprocket wheel 206 fixedly received on stub shaft 208 which is journaled on support 210 coupled to base 24.

As seen in FIGS. 1 and 5, at the opposite end of shaft 162 is gear 212 which engages gear 214 which is rigidly secured at the end of shaft 174.

Thus, counterclockwise rotation of gear 214 is caused by clockwise rotation of gear 212 via its connection along shaft 162 with sprocket wheel 202 which is rotated via chain 204 by rotation of sprocket wheel 130 coupled to shaft 114. Accordingly, belts 166 and 168 and 156 are moved in the directions indicated by the arrows in FIG. 2 when sprocket wheel 130 and its associated shaft 114 which is coupled to the rotary shear knife 106 is rotated.

Referring to FIGS. 1 and 2, a rigid carrier plate 216 is located on transverse block 154 below the path of the cut tape and extending past the two rotary shear knives so as to aid in delivering the cut tape from the shear knife 106 between conveyor rolls 158 and 170. A bolt, not shown, attaches plate 216 to block 154 and is located between the shear knives so as not to interfere with movement of the tape.

As seen in FIGS. 1 and 2, located downstream from the cut tape conveying assembly 20 is the tape applying assembly 22 comprising an upper press roll 222 journaled on shaft 223 and two lower rubber press rolls 224 and 226 journaled on shaft 227. These rolls are in intimate pressed contact. The nip therebetween forms the predetermined position in which the cut tape is applied to the continuous web 38. As seen in FIG. 2, the lower press rolls are adjacent the exit from the upper and lower belt conveyors 156, 166, 168 with press rolls 224 and 226 having their top surfaces in a plane which is horizontal and contains the shafts for the rolls having the lower endless belts thereon.

Further downstream of the press rolls, as seen in FIGS. 1 and 2, are web draw rolls 228 and 230 supported, respectively, on shafts 232 and 234, comprising the web feeding assembly 12.

Shafts 232 and 234 have two gears 236, only the upper one being seen in FIG. 1, at one end thereof so that they rotate together and shaft 234 has at its other end gear 238. This gear 238 engages gear 239 which in turn engages gear 240. Gears 239 and 240 are rigidly supported, respectively, to shafts 241 and 242 which are suitably journalled to the top of base 24.

A driving shaft 243 is suitably journalled on base 24 and has at one end a change gear 244, engaging gear 240. Adjacent gear 244 and on shaft 243 is driving sprocket wheel 245 which is coupled via chain 246 to sprocket wheel 144 on the cutting assembly 18.

Shaft 243 is driven in rotation via motor 247 through a belt 248 riding on pulley wheel 249 on the end of shaft 243 and a second pulley wheel 251 on the motor's shaft 253.

The web draw rolls 228 and 230 are rotated in the directions shown in FIG. 2 to draw the web 38 therethrough.

As seen in FIG. 1, although two lower press rolls 224 and 226 are associated with two sets of endless conveyors, only one set of each need be used if only one row of cut pieces of tape is to be applied to web 38, but more than two can be utilized if more than two rows are required. Moreover, the transverse placement of the press rolls and the conveyors can be varied if the spacing of the rows of the cut pieces of tape on the web 38 is desired by merely moving them transversely along their supporting shafts.

The web support assembly 10 is suitably supported by upright supports, one designated 264 shown in FIG. 2, carrying a shaft 266 supported for rotation. Rolled upon this shaft 266 is a supply of continuous web 38, which can be wrapping paper or gift paper. The web 38 is threaded between rolls 222 and 224 and rolls 228 and 230.

When motor 247 is actuated, belt 248 rotates driving shaft 243 which rotates gear 244. This in turn rotates gear 240, 239 and 238 which rotates shaft 234. Via the two engaged gears 236 at the ends of shafts 232 and 234, both shafts 232 and 234 rotate so that rolls 228 and 230 rotate, as seen in FIG. 2, to draw the web 38 therethrough.

Rotation of shaft 243 also rotates wheel 245 which via chain 246 rotates wheel 144, wheel 138 (see FIG. 3), wheel 134 and wheel 130. Since sprocket wheel 130 is coupled to shaft 114, the rotary shear knives 106 rotate, as do draw rolls 40, 42, 46 and 48 via gears 120, 122, 126, 56 and 58. Rotation of wheel 130 also moves chain 204 to thereby rotate wheel 202 and shaft 162 so that gears 212 and 214 rotate, resulting in actuation of the conveying assembly 20.

OPERATION

In operation, which will be described regarding one row of cut lengths of pressure sensitive tape, the tape 30 as seen in FIG. 1, is first threaded under guide roll 82 and then between draw rolls 40 and 46 and under guide bar 96 and above plate 100.

At this time, motor 247 is energized so that draw rolls 40 and 46 feed the tape 30 to the left as viewed in FIGS. 1 and 2 and the rotary shear knife 106 begins to rotate. The combination of shear knives 106 and 108 cut a predetermined length of tape, indicated in FIGS. 1 and 2 as 250, which is pushed onto carrier plate 216 from rotary shear knife 106 and is engaged at the top by belts 166 and 168 and at the bottom by belt 156. These belts have begun rotation since they are connected, as described above, with the rotation of the rotary shear knife 106.

As seen in FIG. 6, these belts convey the predetermined length of cut tape along their conveyor runs with the predetermined length of cut tape 252 seen in FIGS. 1, 2 and 6 located in the conveying assembly 20 being contacted on the top edges by the bottom runs of belts 166 and 168 and on the bottom by the top run of belt 156.

As specifically seen in FIG. 6, the backing member 254 has its edges adjacent channel bars 182 and 184 and the bottom runs of belts 166 and 168 contact the top of the backing member 254 in those side edges devoid of the double-sided adhesive tape 256 in the center of the backing member. Thus, the belts 166 and 168 can move the cut tape 252 therealong but are not adhered to.

From the conveying assembly 20, the cut tape is conveyed to the nip designated as 258 in FIG. 2 between press rolls 222 and 224 where the cut tape designated as 260 in FIG. 2 is maneuvered into an adhering contact with the moving continuous web 38 in this predetermined position defined by the nip. The web 38 had already begun to move when shaft 243 was rotated by motor 247.

Since the adhesive 256 is on the top of the cut tape 260 shown in FIG. 2, the tape is adhered to the continuous web 38 and this adhesion is aided by the pressure of press rolls 222 and 224.

Further downstream the draw rolls 228 and 230 are shown pulling on the continuous web 38 having another predetermined length of cut tape 262 previously adhered thereto and spaced apart by the desired amount from the next following piece of cut tape 260.

Preferably, the belts 166 and 168 are formed of rubber and the lower belt 156 is formed of rubberized nylon. The remaining parts not specifically mentioned can preferably be formed of metal.

In an actual working embodiment of the apparatus described above, 45 pieces of cut tape were applied to the continuous web where each piece of tape was 1¾" long and the spacing between adjacent pieces on the web was 15". This was accomplished with a driving shaft 243 speed of 45 r.p.m.

The sprocket wheel specifications on the actual working embodiment were as follows:

| Sprocket Wheel | Number of Teeth | Chain Size |
|---|---|---|
| 130 | 25 | 35 |
| 134 | 25 | 35 |
| 138 | 25 | 35 |
| 144 | 25 | 35 |
| 202 | 10 | 35 |
| 206 | 11 | 35 |
| 245 | 25 | 35 |

The gear specifications on the actual working embodiment were as follows:

| Gear | Number of Teeth | Pitch |
|---|---|---|
| 56 | 30 | 20 |
| 58 | 30 | 20 |
| 120 | 12 | 20 |
| 122 | 20 | 20 |
| 126 | 94 | 20 |
| 212 | 20 | 20 |
| 214 | 20 | 20 |
| 236 | 20 | 10 |
| 238 | 20 | 10 |
| 239 | 30 | 10 |
| 240 | 25 | 10 |
| 244 | 52 | 10 |

The relative dimensions of the sprocket wheel, gears, and shafts shown in the drawings are not in accordance with this list. Instead, they have been drawn out of proportion to show them as clearly as possible.

Gear 120 is a change gear since it determines the length of the cut tape. Thus, an increase in the number of teeth and diameter of gear 120 increases the length of the cut tape since gears 56 and 58 rotate faster. A decrease in the teeth and diameter of gear 120 decreases the cut tape's length. In the embodiment described above, a change of one tooth will change the length by about ⅛". To accomplish this it is important to keep the driving shaft 243 and the driven shaft 114 in a 1 to 1 relationship, which is done by having the same dimensions and teeth first on the wheels 245 and 144, described above as 25 teeth and 35 chain size, and second on wheels 134 and 138.

Similarly, gear 244 is a change gear and an increase or decrease in its number of teeth and diameter increases or decreases the speed at which web 38 is drawn and therefore increases or decreases the spacing between adjacent cut lengths of tape applied thereto. In the embodiment described above, a change of one tooth will increase or decrease the spacing by about ¼".

If the apparatus is operated in a cold room a radiant heater placed adjacent the tape support assembly 14 is helpful to assure adequate adherence of the tape to the web.

While the apparatus is described above in relation to the apparatus of U.S. Pat. No. 3,677,144, it can be used in conjunction with any apparatus which requires tape at spaced intervals on a continuous web. Thus, a simple machine which applies wrapping paper to a box in which a discrete length of wrapping paper is associated with a box is especially able to work in conjunction with the apparatus in accordance with the present invention. In that case, the web having the cut pieces of tape thereon would be fed to the machine where the web would be cut and each discrete cut length would be associated with one box, preferably with the cut pieces of tape at the end edges of the cut length of wrapping paper.

While a preferred embodiment has been chosen to illustrate the apparatus and the method of the invention, it will be understood by those skilled in the art that various changes and modifications can be made therein without departing from the scope of the invention as defined in the appended claims.

What is claimed is:

1. An apparatus for sequentially applying predetermined lengths of pressure sensitive tape onto a continuous web of flexible material in spaced relationship wherein the tape comprises a double-sided adhesive tape with a lift-off backing member contacting one of the sides of the adhesive tape and having a width slightly greater than the width of the double-sided adhesive tape to leave on opposed edges of the backing member areas devoid of the adhesive tape, the combination comprising:

first means for supporting a continuous web of flexible material;

second means, engaging the continuous web, for feeding the continuous web past a predetermined tape-applying position;

third means for supporting a continuous strip of pressure sensitive tape;

fourth means, located downstream of said third means, for sequentially cutting the continuous strip of pressure sensitive tape into predetermined lengths;

fifth means, located downstream of said third means, for feeding the continuous strip to said fourth means for cutting;

sixth means for sequentially conveying the cut predetermined lengths in spaced relationship from said fourth means for cutting into adhering contact with the continuous web of flexible material at said predetermined position;

said sixth means comprising endless conveyor means contacting the side of the backing member opposite the side contacting the double-sided adhesive tape, and two thin endless belt conveyors overlying said endless conveyor means and spaced apart a distance at least equal to the width of the double-sided adhesive tape, said two thin endless belt conveyors contacting the side of the backing member contacting the double-sided adhesive tape in the areas devoid of the adhesive tape;

said fourth means for cutting including a rotating housing and blade means supported on said housing; and lubricating means, positioned adjacent said fourth means, for continuously lubricating said rotating housing and blade means during rotation.

2. An apparatus according to claim 1, wherein said two thin endless belt conveyors are resilient.

3. An apparatus according to claim 1, wherein said fifth means comprises a pair of opposed draw rolls, one roll having flanges at both ends, said flanges being knurled and contacting the pressure sensitive tape on the two areas on opposed edges of the backing member devoid of adhesive tape.

4. An apparatus according to claim 1 wherein said second means for feeding comprises a pair of draw rolls receiving the continuous web there between.

5. An apparatus according to claim 1 wherein said fourth means for cutting includes a rigid lower shear knife mounted below the path of the tape, a rotating upper shear knife mounted above the path of the tape and means for continuously rotating said upper shear knife.

6. An apparatus according to claim 1 wherein said fifth means further includes a flexible plate for supporting the tape located upstream of said fourth means for cutting.

7. An apparatus according to claim 6 wherein said fifth means further includes a guide bar located above said flexible plate.

8. An apparatus according to claim 1 wherein said sixth means for sequentially conveying further includes two horizontally opposed channel members receiving the edges of the cut tape therebetween.

9. An apparatus according to claim 1 wherein said sixth means further includes a carrier plate located between said fourth means for cutting and said belt conveyors.

10. An apparatus according to claim 9 wherein said sixth means for sequentially conveying further includes two opposed pressed rolls located at the exit of said belt conveyors and receiving the continuous web therebetween.

11. An apparatus according to claim 10 wherein the predetermined tape-applying position is between said press rolls.

* * * * *